United States Patent [19]

Moore

[11] Patent Number: 5,510,061
[45] Date of Patent: Apr. 23, 1996

[54] NON-WELDED SUPPORT PLATE MEMBER

[75] Inventor: Frank D. Moore, Tallmadge, Ohio

[73] Assignee: Norton Chemical Process Products Corp., Worcester, Mass.

[21] Appl. No.: 280,691

[22] Filed: Jul. 26, 1994

[51] Int. Cl.[6] .................................................. B01F 3/04
[52] U.S. Cl. ................ 261/94; 261/97; 52/180; 52/665; 52/730.100
[58] Field of Search ................ 261/94, 96, 95, 261/DIG. 11, 97; 52/665, 730.1, 730.2, 177, 180

[56] References Cited

U.S. PATENT DOCUMENTS

| | | | |
|---|---|---|---|
| 2,009,384 | 7/1935 | Brett | 52/180 |
| 3,064,954 | 11/1962 | Eckert. | |
| 3,200,549 | 8/1965 | Cripe | 52/177 |
| 3,222,040 | 12/1965 | Eckert. | |
| 3,222,041 | 12/1965 | Eckert. | |
| 4,171,333 | 10/1979 | Moore | 261/94 |
| 4,198,795 | 4/1980 | Barnidge | 52/180 |
| 4,729,857 | 3/1988 | Lee et al. | 261/97 |
| 4,744,929 | 5/1988 | Robinson et al. | 261/94 |
| 4,947,595 | 1/1990 | Douds et al. | 52/730.1 |
| 5,000,883 | 3/1991 | Leva | 281/97 |
| 5,054,253 | 10/1991 | Bedics | 52/177 |
| 5,061,407 | 10/1991 | Nutter | 261/97 |
| 5,069,830 | 12/1991 | Moore et al. | 261/94 |

*Primary Examiner*—Khanh P. Nguyen
*Attorney, Agent, or Firm*—David Bennett

[57] ABSTRACT

Channel beams of a particularly advantageous design are provided. These can be assembled to form a non-welded support plate in a confined environment having any desired configuration and later disassembled and reused elsewhere. The support plates are designed to support tower packing materials whether of the structured or dumped kind.

4 Claims, 1 Drawing Sheet

NON-WELDED SUPPORT PLATE MEMBER

BACKGROUND OF THE INVENTION

This invention relates to mass and heat transfer facilities and specifically to vessels containing packing elements, either structured or dumped, within the vessel. Such packing generally rests upon a support plate at the bottom of a packed section. It is to such support plates that this invention specifically pertains.

The support plate is conventionally a unitary or parallel members of welded construction. The support plate must be capable of handling fluid flow through the vessel. In some cases there may be a single fluid passing in either direction while in other cases there may be countercurrent flow of gas and liquid streams through the vessel. If the flows in either direction predominate excessively, even for a short time, the support plate can become disturbed and its support function impaired. Thus it is important that it have the rigidity that comes from an integral structure rather than a series of interlocking members held together by gravitational forces.

The present invention provides a novel design for a support plate member from which a support plate can be fabricated without welding which has considerable ease of manufacture while also being easy to assemble and disassemble within the vessel. Support plates constructed using such members have great rigidity and resistance to displacement forces while in use.

GENERAL DESCRIPTION OF THE INVENTION

The present invention provides a non-welded support plate component which comprises an elongated channel beam with a generally U-shaped cross-section having perforated sidewalls and adapted to be releasably attached, in the area of the open ends of the channel beam, to adjacent beams lying parallel and in contact therewith on either side.

In use the channel beam members are aligned with one another such that the upper parts of the channel beam sides are in contact. These parts are adapted to be releasably attached to one another by the provision of holes in register with similar holes on the adjacent channel beams such that an attachment means, such as a nut and bolt combination, split pin, C-clamp or the like, can be used to tie the channel beams together in at least two locations along their contiguous lengths. To facilitate the accomodation of the attachment means the channel beam preferably has, adjacent the open ends of the U-shaped cross-section, a portion in which the sides are parallel.

The channel beam preferably has a flat base portion that is narrower than the separation of the open ends of the channel beam. This flat base portion provides a secure engagement with support means within the vessel on which the assembled support plate rests when in position. This support means is typically a ledge placed around the internal surface of the vessel at the appropriate height.

Connecting the base portion with the portion adjacent the open ends are sloping side walls that are provided with perforations adapted to permit fluid flow when a support plate constructed from the channel beams is in use. In applications involving two phase countercurrent flow, the side wall openings should be sufficient to allow vapor to pass without appreciable resistance. In practice this may mean that the openings should represent about 60% or more of the cross-sectional area of the vessel. The degree of slope is dictated by the relative dimensions of the open and closed ends and is preferably uniform on both sides.

In two-phase, counter-current flow operations it is desirable to provide perforations in the base of the channel beam to permit draining of liquids through the support plate. Such perforations should not however be so many or so closely spaced as to lead to a weakening of the structure. The perforations must however be sufficiently large to allow the liquid to pass without building a liquid head which would cause liquid to flow into the side wall openings. Generally suitable perforations represent about 7% or more up to about 10% of the cross-sectional area of the vessel.

A further preferred strengthening feature is the provision of an inwardly directed right angle bend at each of upper edges of the channel beam. This helps to resist any deformation of the beam under the weight of material resting on it during use.

When incorporated in a support plate, the structural strength of a channel beam having the sloping walls described above can be further enhanced by the provision of end closure plates in the shape of isosceles triangles with attachment flanges along the equal sides and adapted to fill the space between the sloping walls of adjacent channel beams and to be attached by means of the attachment flanges to both. This closing plate also closes the opening s between the channel beams preventing packing elements from passing downward through the support plate assembly. The means used to bring about the attachment can be the same means as are used to link the channel beams adjacent their open ends.

DRAWINGS

DESCRIPTION OF THE PREFERRED EMBODIMENTS

Figure 1:
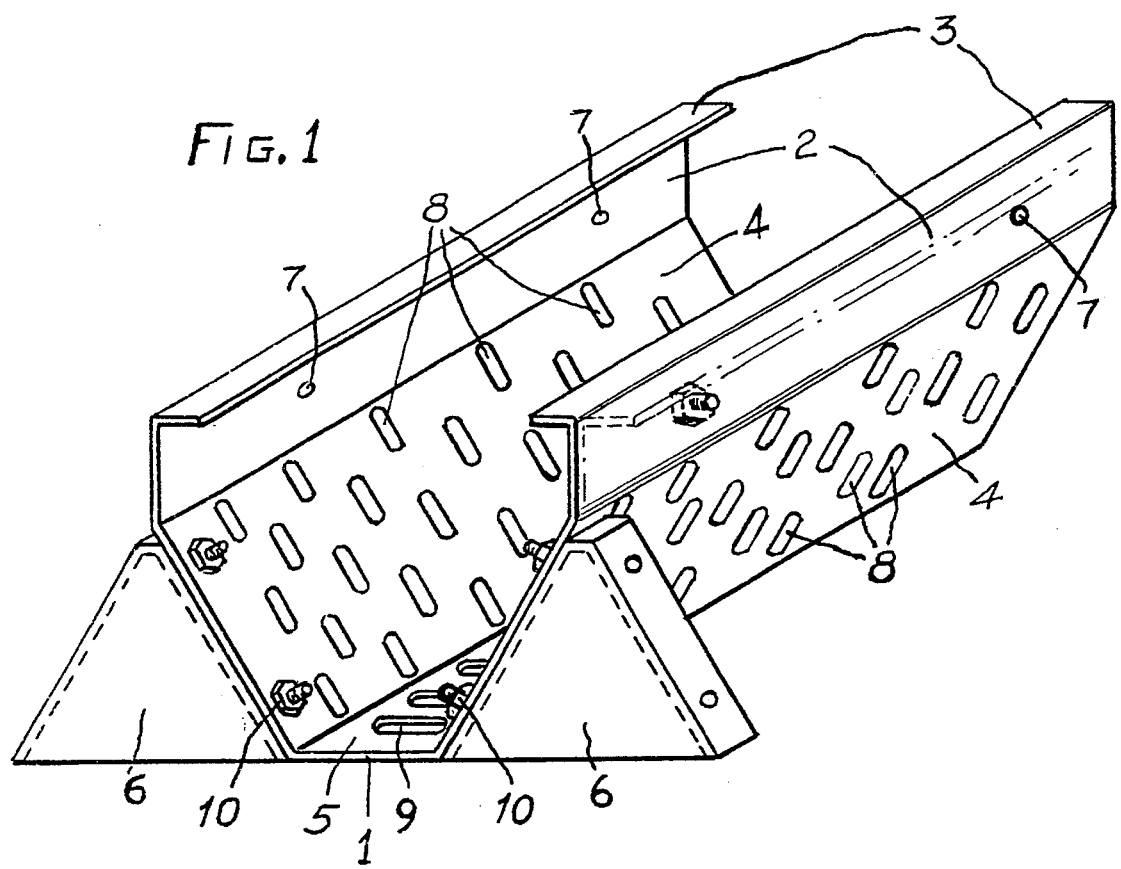
FIG. 1 is a perspective drawing of a preferred channel beam of the invention.

The invention is now described with specific reference to the drawings which illustrate the construction and use of a preferred channel beam according to the invention. This is for the purpose of illustration only and implies no essential limitation on the scope of the invention.

In the drawings, a channel beam 1 having a generally U-shaped cross-section is provided with a flat base portion 5 with sloping sidewalls 4 extending away from the base and increasing in separation with distance from the base. The side walls terminate in parallel wall portions 2 each being provided with an inwardly extending flange 3. The parallel wall portions are provided with a plurality of spaced holes 7 adapted to receive nut and bolt attachment means. The sloping walls are provided with a plurality of perforations 8 adapted to permit ready passage of fluids. Perforations 9 are also provided in the flat base portion 5 for liquid drainage. End plates 6 are bolted to the side walls adjacent the open ends of the channel beam by nut and bolt combinations 10.

Figure 2:
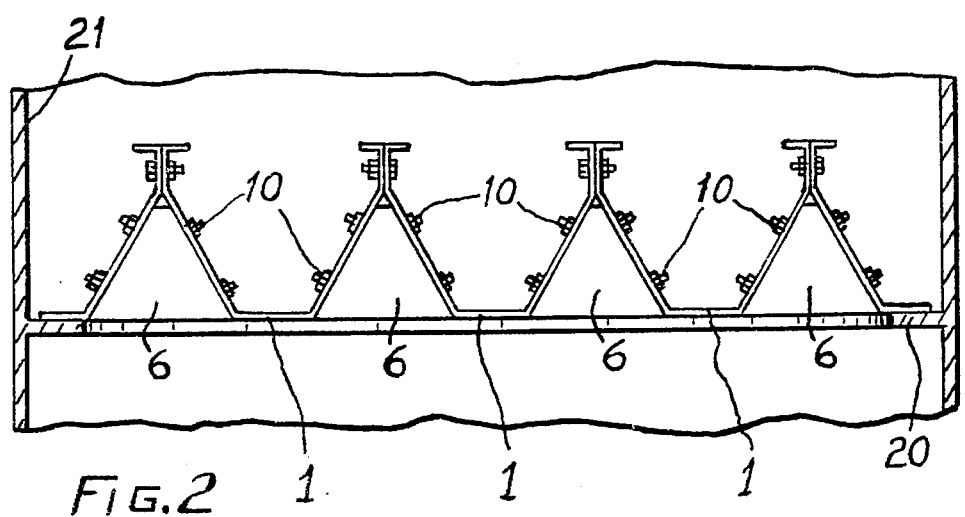
FIG. 2 is a cross-section of a support plate made up of the channel beams illustrated in FIG. 1, in place within a reactor.

FIG. 2 shows a vessel with an assembled support plate comprising three channel beams as illustrated in FIG. 1 with, on either end, a half channel beam of the same design with the flat base portion of these half beams resting on a support ledge 20 which is attached to the inside of the reactor wall 21.

The material from which the channel beams can be constructed depends largely on the environment in which it is to function. Because of the weight to be supported, steel is usually the preferred material with a stainless steel being particularly preferred. Other materials can however be substituted in appropriate circumstances.

In use the support plate can be used to support either structured or dumped packing as desired. It will be appreciated that the support plate can be assembled and disassembled in a confined space without difficulty and can be reused in many different configurations. It therefore represents an extremely adaptable and versatile means of constructing support plates for reactor vessels.

What is claimed is:

1. A support plate comprising a plurality of elongated channel beams each having a generally U-shaped cross-section comprising a flat base portion and sidewalls, wherein the sidewalls each comprise a parallel portion and an inwardly sloping perforated portion which connects the parallel portion with the flat base portion and provide an open end to the channel beam opposite the base portion, said channel beams lying parallel to one another with at least part of the sidewalls adjacent the open ends of the channel beam in contact with the corresponding portion of the adjacent channel beam and releasably connected thereto by attachment means and wherein at least one of the inwardly sloping sidewall portions of at least one of the channel beams is provided with an end plate lying in a plane perpendicular to the length of the channel beam and located at the end thereof, said end plate being attached to the sloping sidewall portion of the channel beam and to the sloping sidewall portion of an adjacent channel beam so as to close off the gap between said sloping sidewall portions of adjacent channel beams.

2. A support plate according to claim 1 in which end plates are provided between all adjacent channel beams and at both ends thereof.

3. A support plate according to claim 1 in which the attachment means by which adjacent channel beams are attached to one another comprise nuts and bolts passed through cooperating holes in the contacting portions of the sidewalls of adjacent beams.

4. A support plate according to claim 1 in which the base portions of the channel beams are provided with perforations.

* * * * *